July 7, 1964
E. B. BLANKENSHIP
3,139,626
INCINERATOR TOILET
Filed July 27, 1961
2 Sheets-Sheet 1
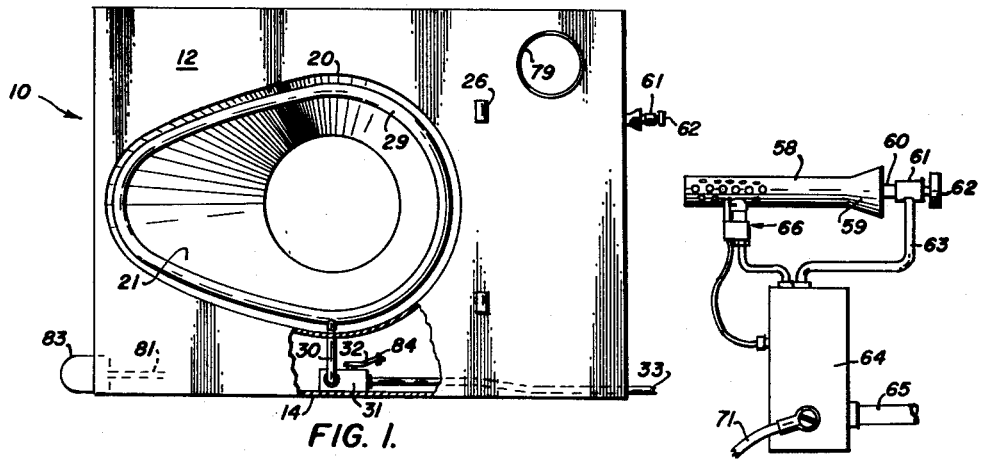
FIG. 1.
FIG. 4.
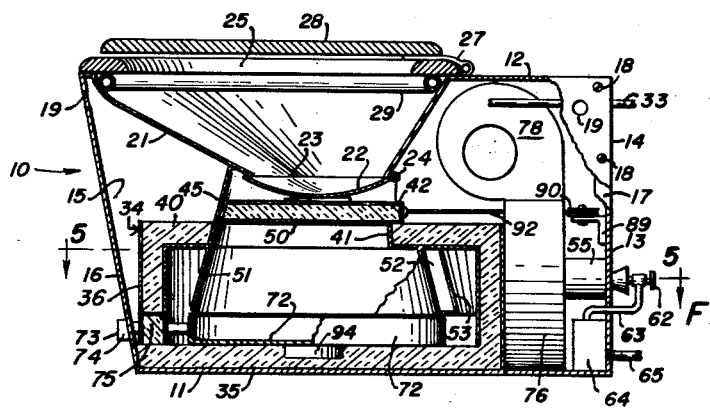
FIG. 2.
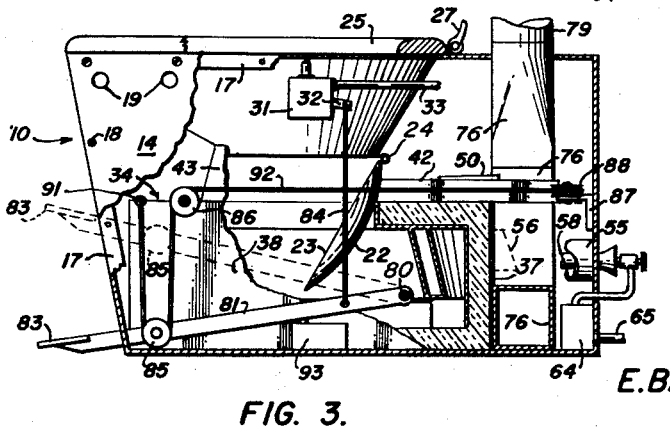
FIG. 3.
E. BAYNE BLANKENSHIP
INVENTOR.
BY *Herbert J. Brown*
ATTORNEY July 7, 1964
E. B. BLANKENSHIP
3,139,626
INCINERATOR TOILET
Filed July 27, 1961
2 Sheets-Sheet 2
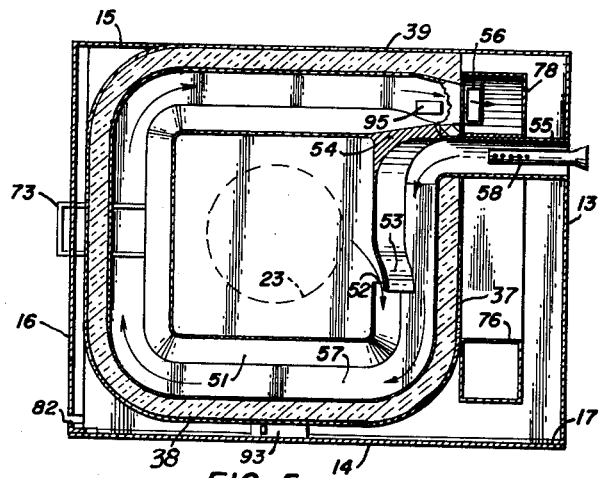
FIG. 5.
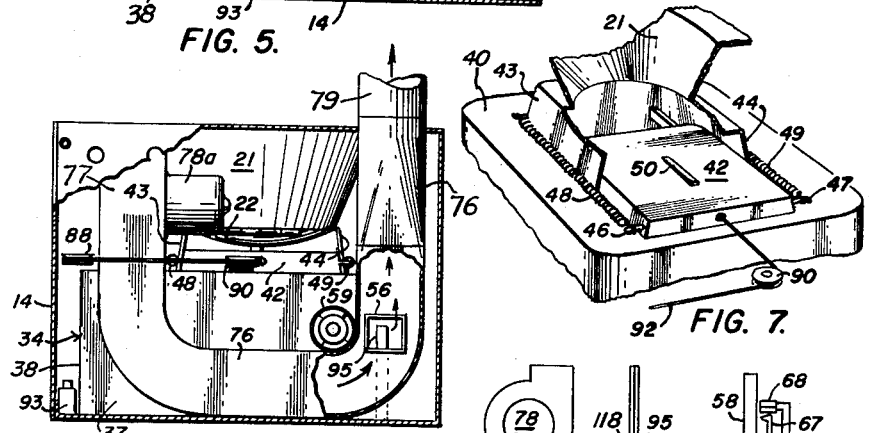
FIG. 6.
FIG. 7.
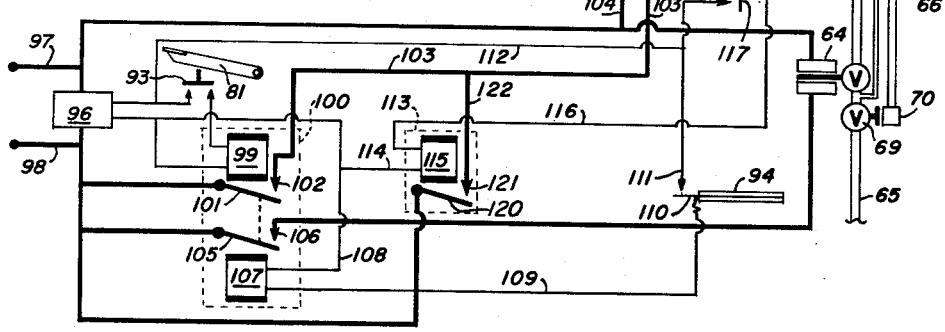
FIG. 8.
E. BAYNE BLANKENSHIP
INVENTOR.
BY *Herbert J. Brown*
ATTORNEY

United States Patent Office 3,139,626
Patented July 7, 1964

3,139,626
INCINERATOR TOILET
Ernest Bayne Blankenship, P.O. Box 35164,
Dallas 35, Tex.
Filed July 27, 1961, Ser. No. 127,397
5 Claims. (Cl. 4—131)

This invention relates to sewage incinerators and has reference to a sanitary closet for installation where sewer lines are unavailable.

In public conveyances, such as airplanes, trains and buses, the provision for sanitary facilities presents special problems which involve such diverse limitations as stringent hygienic requirements, optimum space usage, simple and familiar control means, capacity for repetitive use, inoffensive operation and simple disposal at a depot terminal. Open waste disposal means once used universally by railroads is of course entirely prohibitive for buses, and its continued use on trains is questionable in view of the increasing population densities in many parts of the country. Bulk accumulation of raw waste for eventual disposal at a trip destination entails the possibility of a health hazard and requires an allocation of otherwise useful space for waste storage. Chemical treatment in situ adds to the weight of a plumbing facility and further increases its space requirement; necessary replenishment of chemicals and control of the quality increase operating expenses. Immediate incineration of waste products obviates the need for special storage tanks and insures the elimination of unsanitary conditions. While the minimum space requirements of an incineration chamber offer a possibility of compact construction, the heat of incineration has heretofore been a deterrent factor in the use of this type of facility. The temperatures required to reduce organic waste to an odorless ash are usually sufficient to heat a compact sanitary closet so that it becomes unusable and a dangerous object in itself for intermittent use.

An object of the present invention is to provide a sanitary closet which does not require sewer line connections and which may be installed in public conveyances or the like where rigorous hygienic standards must be met.

Another object of the invention is to provide an efficient and compact apparatus capable of reducing human waste to odorless ash.

A further object of the invention is to provide a waste incineration system for a sanitary closet and which system avoids the direct application of flame within a waste incinerator.

Another object of the invention is to provide means for reducing waste to ash by radiant energy.

A particular object of the invention is to provide a forced draft system for an incineration type sanitary closet and wherein the intake of the forced draft system serves as a coolant for the seat and external cabinet of the closet thereof.

Another object of the invention is to provide an air circulation system for a sanitary closet and wherein heat distribution, cabinet cooling and fume exhaust are accomplished by a single fan.

A further object of the invention is to provide a control system for an incinerator type sanitary closet and which system prevents cessation of cooling until incineration has been completed and the heated parts of the sanitary closet have been cooled to a comfortable and usable temperature level.

These and other objects will become apparent from the following description and the accompanying drawing, wherein:

FIGURE 1 is a broken plan view of the invention shown with its seat and lid removed.

FIGURE 2 is a partially sectional and elevational view of the invention showing internal features of its insulating box and the intake of its U-shaped duct.

FIGURE 3 is a broken side elevational and partially sectional view of the invention showing construction and location of the pedal thereof.

FIGURE 4 is an enlarged side elevational view of the burner and fuel control system of the invention.

FIGURE 5 is a sectional view taken along line 5—5 of FIGURE 2.

FIGURE 6 is a broken and partially sectional rear elevational view of the invention showing the U-shaped duct thereof.

FIGURE 7 is a broken perspective view of the bowl and insulating box of the invention.

FIGURE 8 is a schematic diagram of the electrical control system of the invention.

In the drawings, a box-like cabinet 10 is constructed with horizontally disposed base and top walls 11 and 12 spaced from but parallel with one another and with a rear wall 13 and side walls 14 and 15 extending vertically between the base and top walls 11 and 12, but with its forward wall 16 inclined outwardly and upwardly from the base wall 11. One of the side walls 14 is detachably secured to flanged edges 17 of the top, base, forward and rear walls of the cabinet 10 by screws 18. A plurality of circular apertures 19 are regularly spaced from one another and are formed through the forward wall 16, rear wall 13 and side walls 14 and 15 of the cabinet 10 in horizontal alignment with one another. An ovular opening 20 is formed in the top wall 12 of the cabinet 10 and is there disposed with its major axis directed forwardly and rearwardly with respect to the walls of the cabinet and is positioned equidistantly between the side walls 14 and 15 and nearer the forward wall 16 than the rear wall 13. A bowl 21 which may be integrally formed with the top 12 of the cabinet 10 depends from the peripheral edge of the opening 20 in the top of the cabinet and is shaped generally as a semi-ellipsoid or semi-ovoid having its lower portion truncated on a horizontal plane. A cup 22 conforming generally to the lower portion of the bowl 21, but having a greater span between the diametrically opposite portions of its lip 23 than the corresponding span between opposite edges of the truncated portion of the bowl is pivotally connected to the bowl by a hinge 24 which permits the cup to be pivoted into overlapping contact with the lower portion of the bowl. An annular seat 25 is affixed to the top 12 of the cabinet 10 and is positioned about the opening 20 with the inner edge of the seat projecting inwardly of the perimeter of the opening. Transversely aligned hinges 26 are attached to the top 12 of the cabinet 10 rearwardly of the opening 20 therein and are adapted to receive corresponding ends of upwardly arched hinge straps 27 attached to a lid 28 positioned adjacently above the seat 25. Immediately beneath the seat 25 a spray ring 29 constructed as a continuous tubular member diametrically smaller than the opening 20 in the top 12 of the cabinet 10 is provided with a plurality of orifices in its lower surface and is positioned within the bowl 21 where it is horizontally disposed adjacent the walls thereof. A water line 30 communicates with the spray ring 29 interiorly of the bowl 21 and extends therefrom through rear wall 13 of the bowl to connection with a flush valve 31 positioned within the cabinet 10 inwardly adjacent the removable wall 14. The flush valve 31 is provided with an actuating lever 32 projecting rearwardly and upwardly therefrom in its normal position and is connected at its intake port with a water pressure line 33 which communicates with a water main or reservoir (not shown). The flush valve 31 may be of any suitable type such as a time cycling flow valve or a limited metering mechanism, it being understood that a variety of suitable flush valves are currently made and sold.

Within the box-like cabinet 10 an insulating box 34 is positioned with its base 35 secured to the forward portion of the base 11 of the cabinet. Forward, rear and opposite side walls 36, 37, 38 and 39 of the insulating box extend vertically from the base thereof and are spaced from corresponding walls of the cabinet 10. The insulating box 34 is positioned beneath the bowl 21 and the top 40 of the insulating box is provided with a rectangular opening 41 which is larger than but in vertical alignment with the opening in the base of the bowl 21. A rectangular cover 42, made of thermal insulating material, is wider than the opening 41 in the top 40 of the insulating box 34 and is slidably positioned thereover. Longitudinal guide members 43 and 44 project upwardly from the top 40 of the insulating box 34 at positions adjacent the side edges of the cover 42 and make supporting contact with the bowl 21; a forward stop plate 45, integrally constructed with the longitudinal guide members 43 and 44 projects upwardly from the forward edge of the rectangular opening 41 and likewise makes supporting contact with the bowl 21. Posts 46 and 47 are respectively secured to opposite side edges of the rear portion of the cover 42 and project laterally therefrom beyond the longitudinal guide members 43 and 44; at each side of the cover springs 48 and 49 extend from the outer ends of the posts to corresponding points of attachment at the forward portions of the guide members 43 and 44. A wedge 50 is secured to the upper surface of the cover 42 and is there centrally positioned with its vertical thickness diminishing forwardly; the thickness of the rearward portion of the wedge 50 is such that when the cover 42 is in its forwardmost position, as urged by the springs 48 and 49, the cup 22 is held thereby in perimetrical engagement with the bowl 21. A hollow truncated pyramid 51 open at its base and top is constructed of corrosion resistant metals such as stainless steel and is positioned within the insulating box 34 so that the top of the cone is subjacent the cover 42 and is in vertical alignment with the opening in the base of the bowl 21. At the rear side of the pyramid 51 a vertical slot 52 (FIGURE 5) is formed in the wall thereof and the wall at one side of the slot is extended in parallel relationship with the wall at the opposite side of the slot to form a circumferential duct 53 communicating the interior of the pyramid with the remainder of this space within the insulating box 34. A vertical partition 54 extends from a rear corner of the pyramid 51 to the wall of the insulating box 34. A tubular seat shield 55 is attached to the rear wall 13 of the cabinet 10 and extends through the rear wall 37 of the insulating box 34 at one side of the partition 54; an exhaust duct 56 extends through the rear wall 37 of the insulating box 34 at the other side of the partition 54 and projects exteriorly of the insulating box. Hence, an air passageway 57 is formed within the insulating box 34 and extends from the heat shield 55 to the exhaust duct 56 and passes around the pyramid 51 and by the circumferential duct 53 communicating with the interior of the pyramid. A burner 58 is positioned within the heat shield 55 and a flared end 59 of the burner projects exteriorly of the cabinet 10. A gas injection tube 60 is positioned within the burner 58 and projects exteriorly of the cabinet 10 where it communicates with a manual adjustment valve 61 provided with a suitable control knob 62. A gas delivery tube 63 communicates at one of its ends with the manual valve 61 and communicates at its other end with a solenoid control valve 64 which may be any of a number of commercially available types. A gas service line 65 communicates with the gas delivery tube 63 through the solenoid control valve 64 and also communicates with any suitable source of combustible gas. A safety pilot 66, integrally constructed with the solenoid control valve 64, is comprised of an auxiliary burner 67 positioned in the path of the exhaust of the injection line 60 and a thermocouple 68 positioned within the flame area of the auxiliary burner 67. As illustrated schematically in FIGURE 8, a safety valve 69 is inserted in the gas service line 65 and is held open by a magnet 70 in electrical connection with the thermocouple 68. This, or an equivalent safety pilot system, may be used to prevent the discharge of unignited combustible gases into the air passageway 57. A conduit 71 including electrical leads, to be described, is secured to the gas control valve 64 and is electrically connected to the solenoid therein.

A shallow cylindrical pan 72 is positioned beneath the pyramid 51 within the insulating box 34 and the upper edge of the sides of the pan make sealing contact with the base edge of the pyramid. The pan 72 rests upon the base 35 of the insulating box 34 and is slidably positioned for withdrawal through horizontally aligned openings, not numbered, in the respective forward walls 16 and 36 of the cabinet 10 and the insulating box 34. A handle 73 is attached to the pan 72 and projects forwardly thereof and carries panels 74 and 75 adapted to fit within and obstruct the horizontally aligned openings in the forward walls 16 and 36 of the insulating box 10 and the cabinet 34. A U-shaped air duct 76 is positioned within the cabinet 10 between the rear wall 13 thereof and the insulating box 34. One end of the U-shaped duct is formed as a cylindrical housing 77 and is adapted to contain and pivotally support a centrifugal blower 78 therein and also to support an electric motor 78a having its shaft connected in driving relationship with the centrifugal blower. The other end of the U-shaped duct 76 projects through the top of the cabinet 10 near a rearward corner thereof and is connected to a vent tube 79 extending to communication with the atmosphere exteriorly of the building or vehicle within which the invention is employed. Beneath the cylindrical housing 77 and the blower 78 the U-shaped air duct 76 defines a closed air path which descends from the blower to the base 11 of the cabinet 10 for part of its length, extends interiorly and transversely across the base of the cabinet in its central portion, and then ascends to and through the top of the cabinet for the rest of its length. The transverse portion of the U-shaped duct 76 extends beneath the heat shield 55 within the cabinet 10, and the lower part of the ascending portion of the U-shaped duct 76 receives and communicates with one end of an exhaust duct 56 of the air passageway 57.

A pivot pin 80 is exteriorly attached to a side 38 of the insulating box 34 near the base 35 thereof, and an actuating bar 81 is pivotally connected at one of its ends to the pin from which it extends forwardly through a vertical slot 82 in the forward wall 16 of the cabinet 10. The forward end of the actuating bar 81 is flattened horizontally to constitute a foot pedal 83 projecting forwardly of the cabinet 10 near the base 11 thereof. A link 84 attached to the bar 81 at a position forwardly spaced from the pivot pin 80 extends to and is connected with the actuating lever 32 of the flush valve 31. A pulley 85 is rotatably secured to the bar in a vertical plane of rotation at a position thereon spaced rearwardly of the foot pedal 83. A second pulley 86 is rotatably attached in a vertical plane of rotation to a wall 38 of the insulating box 34 at a position near the top 40 thereof and is located in general vertical alignment with the pulley 85 on the actuating bar 81. An L-shaped bracket 87 (FIGURE 3) is interiorly attached to the rear wall 13 of the cabinet 10 in a corner thereof, and a third pulley 88 is pivotally mounted on the L-shaped bracket for rotation in a horizontal plane. A second L-shaped bracket 89 (FIGURE 2) is centrally attached to the interior surface of the rear wall 13 of the cabinet 10 and a fourth pulley 90 is mounted on the second bracket 89 in a horizontal plane of rotation. A stud 91 projects outwardly of a side wall 38 of the insulating box 34 and is located thereon forwardly of the second pulley 86. A cable 92 is attached at one of its ends to the stud 91 and extends therefrom to peripheral engagement with the pulleys 85, 86, 88 and 90 in the order of their description; the other end of the cable is attached to the rearward edge of the cover 42 of the insulating box 34.

A normally open push button type electrical switch 93 is mounted on the floor of the cabinet 10 beneath the actuating bar 81 and is disposed with its button adapted for engagement with the bar when the bar is depressed. A thermostat 94 responsive to the temperature of the pan 72 is embedded in the base 35 of the insulating box 34 directly beneath the center of the pan with which it makes physical contact. A second thermostat 95 is positioned in the air passageway 57 about the pyramid 51 and is located therein near its exhaust port 56. A transformer 96, having the leads 97 and 98 of its primary winding (not shown) connected across a voltage source, has its secondary coil wired in series with the switch 93 which is also wired in series with the closing coil 99 of a toggle type double pole single throw relay 100. A first armature 101 and its contact point 102 of the double pole single throw relay 100 are wired in series with a lead 98 electrically connected to one side of the voltage source and with a first lead 103 of the motor of the centrifugal blower 78; the other lead 104 of the motor of the blower is wired to the other side of the voltage source through its lead 97. A second armature 105 and contact point 106 of the double pole single throw relay 100 are wired in series with one side of the voltage source through its lead 98 and with one side of the coil of the solenoid 64; the other lead of the solenoid 64 is electrically connected to the other lead 97 of the voltage source. An opening coil 107 of the double pole single throw relay 100 is wired by one of its leads 108 to one side of the secondary coil of the transformer 106 and is electrically connected by its other lead 109 to the contact arm 110 of the normally open thermostat 94 responsive to the temperature of the pan; the contact point 111 of the normally open thermostat 94 is connected electrically through a lead wire 112 to the other side of the secondary winding of the transformer 96. A by-pass relay 113 of the normally open single pole single throw type has a first lead 114 of its coil 115 electrically connected to one side of the secondary winding of the transformer 96 and the other side 116 of its coil in electrical connection with the normally open contact arm 117 of the thermostat 95 positioned within the air passageway 57 about the pyramid 51; the contact point 118 of this thermostat is electrically connected through leads 119 and 112 to the second side of the secondary winding of the transformer 96. The armature 120 of the by-pass relay 113 is connected by a lead 98 to one side of the voltage source, whereas the contact point 121 of the by-pass relay is electrically connected by leads 122 and 103 to the contact point 102 of the first armature 101 of the toggle relay 100.

In operation, depression of the foot pedal 83 exteriorly of the cabinet 10 displaces the actuating bar 81 within the cabinet. The vertical link 84 is carried downwardly by the bar 81 and depresses the actuating lever 32 of the flush valve 31 which releases a predetermined volume of water from the water line 33 through the spray ring 29 into the bowl 21. Upon downward displacement of the bar 81 the pulley 85 attached thereto extends the cable 92 between the stud 91 and the second pulley 86, attached to the insulating box 34 by a distance equaling twice the length of the travel of the first pulley, and the cable is drawn about the third and fourth pulleys 88 and 90 displacing the cover 42 rearwardly against the tension of the springs 48 and 49. Withdrawal of the cover 42 removes the wedge 50 from beneath the base of the bowl 21 and the cup 22 is urged by gravity about its hinge 24 and spills its contents into the pan 72. At the lower limit of its travel, the bar 81 engages the actuating button of the switch 93 which closes the circuit of the secondary winding of the transformer 96 and the closing coil 99 of the double pole single throw toggle relay 100. The first armature 101 of the double pole single throw relay 100 closes the circuit of the motor of the blower 78; the second armature 105 completes the circuit of the solenoid 64 which actuates the valve of the burner 58. Hence, the blower 78 and burner 58 are actuated simultaneously by the switch 93, but release of the foot pedal 83 does not interrupt the described circuits although the cover 42 and cup 22 are returned to their original positions by the springs 48 and 49.

The blower 78 draws air through the apertures 19 in the cabinet 10 into the U-shaped duct 76 and forces air past the exhaust port 56 in the U-shaped duct and out of the vent 79. The intake of the blower 78 is thus used as a coolant for the cabinet 10 and prevents excessive heating of the same from the flame and exhaust system of the burner 58. The exhaust port 56 communicating the air passageway 57 about the pyramid causes a pressure reduction in the air passageway when air is forced through the U-shaped duct 76 and draws air through the heat shield 55 about the burner 58 into the passageway. The vertical slot 52 in the pyramid also acts as a venturi opening and causes a pressure reduction within the pyramid when a draft is forced through the circumferential passageway 57. Air flowing through the passageway 57 is heated by the flame of the burner 58 and heats the pyramid 51 about which it flows. As the pyramid 51 is heated it radiates heat into the pan 72 and its contents; the angularity of the walls of the pyramid with respect to the pan 72 directs heat downwardly toward the pan and its contents. As water and excretion within the pan 72 are heated, evaporation commences and vapors are drawn through the vertical slot 52 into the passageway 57. Until all moisture is so removed from the pan 72, evaporation tends to limit the temperature of the contents thereof. After all moisture has been driven from the pan the temperature of its contents rises sharply and its component waste products are reduced to a substantially odorless ash by absorption of sufficient heat. Responsive to heat within the passageway 57, the thermostat 95 positioned near the exhaust port 56 completes the coil circuit of the single pole single throw by-pass relay 113 the armature circuit of which by-passes the first armature 101 of the double pole single throw relay 100 in the circuit of the motor of the blower. When the temperature of the pan 72 has been elevated to a point beyond that necessary to assure reduction of excretia to an ash, the thermostat 94 beneath the pan closes the circuit of the opening coil 107 of the double pole single throw relay 100 and the armatures 101 and 105 interrupt their respective circuits with the solenoid 64 and the motor of the blower 78. The solenoid thus closes the valve 64 of the burner 58; the circuit of the motor of the blower 78 through the armature of the single pole single throw by-pass relay 113 serves as a shunt bypassing the double pole single throw relay 100 so long as the circuit of the coil 115 of the single pole single throw relay 113 is kept closed by the thermostat 95 in the passageway 57. Therefore, the blower 78 continues to run after the burner 58 has been shut off for such period of time as is required to cool the pyramid 51. It should be remembered that operation of the blower 78 entails cooling of the cabinet 10; hence, the cabinet never becomes excessively heated and its comfortable use is not impaired by frequent utilization.

From time to time the pan 72 may be withdrawn through the forward wall 16 of the cabinet 10 for emptying. Residual matter within the pan 72 consists of dehydrated non-combustible substances which have been subjected to temperatures which have rendered them odorless and hygienically inert.

The invention is not limited to the exemplary construction herein shown and described, but may be made in various ways within the scope of the appended claims.

What is claimed is:

1. In an incinerator type toilet including an outer cabinet and a substantially closed combustion chamber interiorly spaced from the walls of said outer cabinet, at least one air intake port in a wall of said outer cabinet, means driving air through said air intake port into said outer cabinet, an exhaust duct extending interiorly of said outer cabinet and communicating the interior of said outer cabinet with the atmosphere exterior thereof, an air passageway about the periphery of said combustion chamber and having one wall common therewith and having an intake portion sealed from the interior of said outer cabinet and communicating with the atmosphere exterior thereof and having an exhaust portion in communication with said duct, a venturi outlet on said exhaust portion of said air passageway within said duct, an opening communicating the interior of said combustion chamber with said air passageway and means within the said air passageway providing heat within said combustion chamber.

2. The invention as defined in claim 1 and including means de-energizing said means providing heat within said combustion chamber and means forcing air through said air intake ports in the order last named.

3. The invention as defined in claim 1 and including: a first thermostat in thermal contact with the bottom of said combustion chamber and electrically connected to said means providing heat within said combustion chamber for de-activation of the latter when said thermostat is subjected to a temperature exceeding a preset level, and a second thermostat positioned in thermal contact with said combustion chamber and electrically connected to said means forcing air through said air intake ports for de-activation of the latter when said thermostat is subjected to a temperature lower than a preset level.

4. The invention as defined in claim 1 and wherein said means providing heat within said combustion chamber includes a heat source within said air passageway and wherein said wall common to said combustion chamber and said air passageway is inclined upwardly and inwardly with respect to said combustion chamber.

5. In an incinerator type toilet as defined in claim 1 and wherein the inner wall of said air passageway is a heat conductor.

References Cited in the file of this patent

UNITED STATES PATENTS

| | | |
|---|---|---|
| 2,768,386 | Graef et al. | Oct. 30, 1956 |
| 2,882,534 | Jauch et al. | Apr. 21, 1959 |
| 2,903,709 | Blankenship et al. | Sept. 15, 1959 |
| 2,995,097 | Kruckerbery et al. | Aug. 8, 1961 |
| 3,020,559 | Blankenship et al. | Feb. 13, 1962 |
| 3,059,597 | Wood | Oct. 23, 1962 |